United States Patent [19]

Miller

[11] Patent Number: 5,485,301
[45] Date of Patent: Jan. 16, 1996

[54] OPTICAL COMMUNICATIONS

[75] Inventor: Lee D. Miller, Filton, Great Britain

[73] Assignee: British Aerospace PLC, London, England

[21] Appl. No.: 126,201

[22] Filed: Sep. 24, 1993

[30] Foreign Application Priority Data

Oct. 24, 1992 [GB] United Kingdom ............... 9222392

[51] Int. Cl.[6] ............................................. H04B 10/04
[52] U.S. Cl. ............................ 359/181; 359/305; 359/191
[58] Field of Search ............................ 359/149–151, 359/154, 181, 182, 191–193, 152, 168–169, 170, 285, 287, 305, 312; 381/172; 385/7; 372/24, 28

[56] References Cited

U.S. PATENT DOCUMENTS

| 3,517,332 | 4/1963 | Maria | 359/305 |
|---|---|---|---|
| 4,256,362 | 3/1981 | Bardos | 359/29 |
| 4,516,853 | 5/1985 | Pearson | 356/152 |
| 4,742,576 | 5/1988 | McMahon | 359/191 |
| 4,814,769 | 3/1989 | Robin et al. | 342/45 |
| 5,146,358 | 9/1992 | Brooks | 359/181 |
| 5,365,239 | 11/1994 | Stilwell, Jr. | 342/368 |

FOREIGN PATENT DOCUMENTS

| 187086 | 7/1986 | European Pat. Off. |
|---|---|---|
| 0500268 | 8/1992 | European Pat. Off. |
| 2041685 | 9/1980 | United Kingdom |
| 2113939 | 8/1983 | United Kingdom |

Primary Examiner—Jose L. Couso
Assistant Examiner—Kinfe-Michael Negash
Attorney, Agent, or Firm—Cushman, Darby & Cushman

[57] ABSTRACT

An optical communications system which facilitates rapid establishment of communications between two stations (1, 2). The system uses acousto-optic cells (5, 6) for scanning and frequency modulating a laser beam. The frequency shift introduced by the cell (6) is indicative of the direction of arrival of the beam at a remote station (2). By detecting the shift, the relative positions of the two stations (1,2) may be deduced. The invention is suitable for use with secure communication systems and IFF systems.

5 Claims, 1 Drawing Sheet

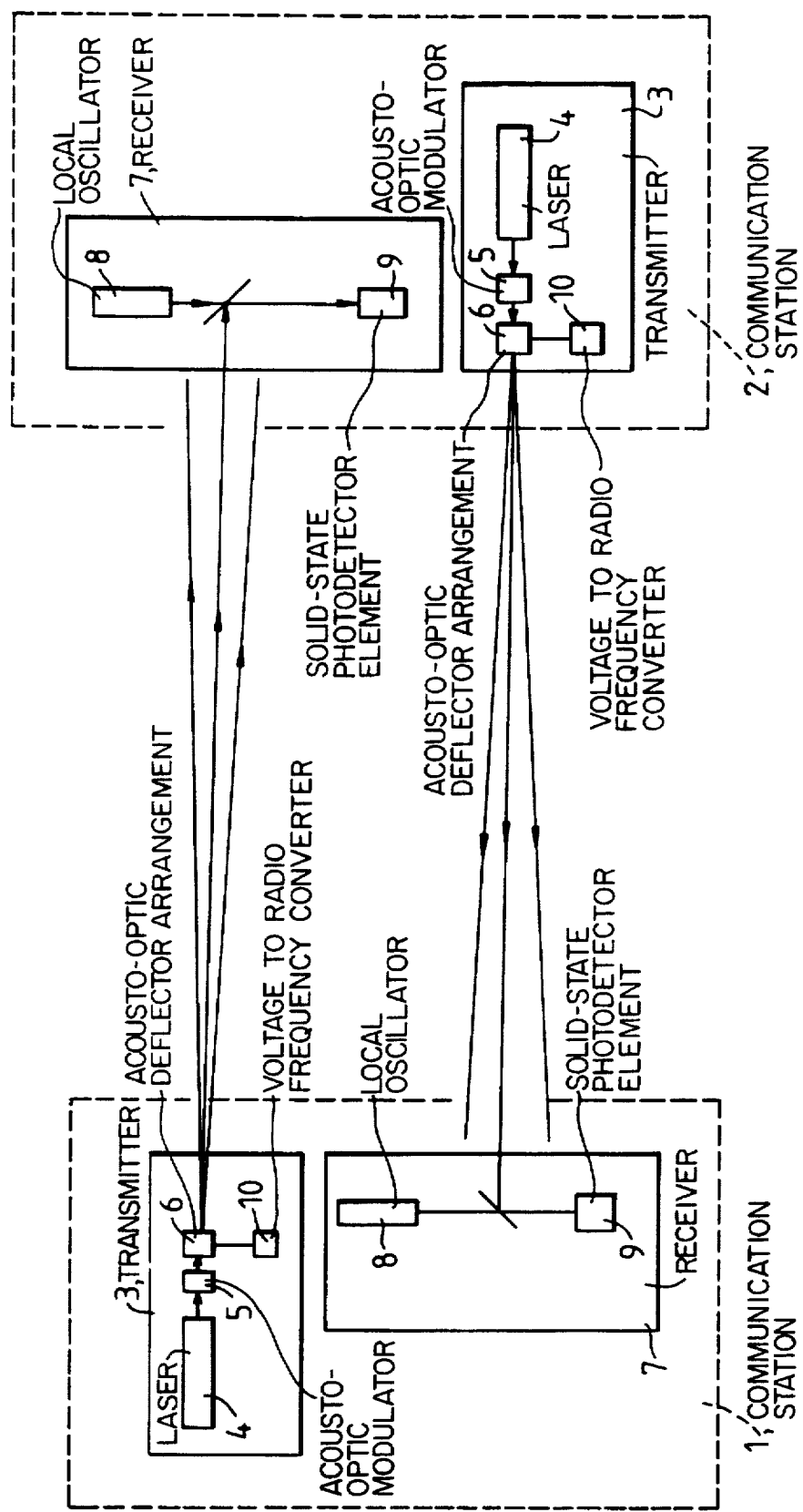

OPTICAL COMMUNICATIONS

BACKGROUND OF THE INVENTION

FIELD OF THE INVENTION

This invention relates to optical communication systems.

One object of the invention is to provide a means establishing and maintaining communication between two or more stations whose relative location is initially unknown, and establishing such communication very rapidly.

According to the present invention, an optical communication system comprises a transmitter including means for producing a frequency-modulated optical beam, acousto-optic deflector cell means for scanning said beam and for introducing a frequency shift into the frequency-modulated optical beam; and a receiver including means for detecting a frequency-shifted, frequency-modulated optical beam and means for determining the frequency thereof.

The means for producing a frequency-modulated optical beam may, conveniently, be a laser coupled to an acousto-optic modulator.

The means for determining the frequency of a frequency-shifted, frequency-modulated optical beam may comprise a coherent detection system employing heterodyne techniques, for example.

The deflector cell means may comprise any suitable material which exhibits an acousto-optic effect ie. diffraction of light by acoustic waves.

One example of such a material is tellurium dioxide. Acoustic waves are usually coupled into the cell via a piezoelectric transducer, for example, which is bonded to one face of the cell.

The theory of operation of acousto-optic devices is well-documented- See for example "Principles of Acousto-Optic Devices" by V. M. Ristic.

As is known, an acousto-optic deflector cell may be configured to receive a beam of laser light, of frequency $f_o$ say, and in response to a high frequency drive signal applied to the cell (in the MHz to GHz range), some of the light emerging from the cell is deflected to form a so-called "first order beam". The angle of deflection of this beam with respect to the undeflected zero order beam is substantially proportional to the frequency of the drive signal, (fac) which initiates a sound wave which propagates across the cell. Hence by varying the drive signal frequency in some controllable manner, a beam may be scanned in a single plane. Two dimensional scanning may be achieved by incorporating a second deflector cell through which the first order beam. produced by a first cell is arranged to pass. Various means for producing a two-dimensionally scanned beam (for missile guidance applications) are described in GB-A-Z, 113,939 for example.

In addition to suffering a deflection, the first order beam also undergoes a frequency shift, such that the frequency $f_d$ of the deflected, first order beam can be written;

$$f_d = f_o \pm fac$$

i.e. the frequency of the deflected beam is shifted with respect to that of the incident light by an amount equal to the frequency of the drive signal. In effect, the incident light is Doppler-shifted by the frequency of the acoustic waves which propagate across the cell. The direction of the shift (i.e. an increase or decrease in frequency) is determined by the direction of propagation of the sound wave relative to the incident laser radiation.

It follows then that the angle of deflection is uniquely related to this "Doppler" shift and thus that every beam angle emerging from the cell is uniquely coded by means of a unique frequency shift. The present invention exploits this Doppler shift effect.

SUMMARY OF THE INVENTION

BRIEF DESCRIPTION OF THE DRAWINGS

An embodiment of the invention will now be described with reference to the drawing which is a schematic representation of an optical communications system.

DESCRIPTION OF PREFERRED EMBODIMENTS

The drawing shows two communications stations 1 and 2 in which station 1 wishes to establish and maintain a communications link with a remote station 2. Each station is equipped with a transmitter 3 comprising a laser 4, an acousto-optic modulator 5 and an acousto-optic deflector arrangement 6. Each station is also equipped with a receiver 7. The receiver 7 incorporates a local oscillator 8 and solid-state photodetector element 9.

Coherent detection of a scanned frequency-modulated beam from the transmitter 3 can be done by directing received light and laser light from the local oscillator 8 onto the detector element 9. This results in the generation of a beat signal at the detector output which is detected as an "intermediate frequency" (IF) by external electronics. Any changes in the amplitude, frequency or phase of the scanned beam (or local oscillator) will be transferred to the beat signal which means that the IF signal contains all the original information of the scanned beam. Hence the magnitude of the Doppler frequency shift can be readily established.

The acousto-optic deflector arrangements 6 are configured to produce a two-dimensional scanning pattern. In this preferred embodiment the frequency of the drive signal to the acousto-optic cells Is controlled by a fast-switching, digitally controlled voltage to radio frequency converter 10. This ensures a high scan rate which enables communications to be rapidly established.

The local oscillator 8 of one station must be matched with the laser 4 of the other station. One way of achieving this is as follows.

The transmitter 3 of station 1 is pointed towards station 2. The degree of accuracy required is determined by the acousto-optic deflector field of regard. Typical field angles will be greater than a few degrees. Station 1 then scans its CW laser 4 at a high rate (typically many hundreds of kilohertz). The receiver 7 at station 2 will then be occasionally illuminated with the radiation. The laser radiation from station 1 will contain a fixed pre-determined frequency modulation by virtue of the modulator 5. This will allow the local oscillator 8 in station 2 to be varied until an instantaneous frequency can be extracted. At this time station 2 begins to transmit using the same method as described above. When station 1 occasionally receives the signal transmitted by station 2, station 1 ceases its transmission and commences the matching of its local oscillator 8 with the transmission from station 2. Once this has been achieved the two stations are ready to communicate.

It should be noted that this process should be completed in a relatively short timescale due to the rapid scanning ability of the acousto-optic system.

At this point the two stations have established intermittent communication but are still unaware of each others location.

Full communication is established as follows.

Station 1 commences a rapid scan. When station 2 receives the signal it extracts the Doppler shift (which varies with angle of arrival of the scanned beam) from the received signal. Station 2 then broadcasts this information by frequency modulating its own scanned beam using the modulator 5. Station 1 will then, on some occasion, receive the information communicated by station 2. This information relates to the co-ordinates of station 2 relative to station 1. Station 1 then ceases scanning and 'locks' onto the co-ordinates received from station 2. The signal received from station 2 contains, by virtue of the acousto-optic deflector Doppler shift, the co-ordinates of station 1 relative to station 2.

Station 1 therefore broadcasts these co-ordinates straight to station 2. Station 2 then ceases scanning and 'locks' onto the co-ordinates transmitted by station 1.

The above process of establishing full communication is expected to occur very rapidly due to the high scan rate.

The two stations can now communicate any information, via their transmitters 3 and the modulator 5, until communication is interrupted by, say, the movement of one station relative to the other. As soon as this happens the two stations commence a search pattern in order to establish full communication. Because of the high scan rate this process occurs very rapidly assuming that any relative movement is not extreme or erratic.

Information communicated by frequency modulation of the scanned beam could relate to IFF information, for example. One other application to which the invention is particularly suited is that of secure communications.

I claim:

1. An optical communication system comprising:

a transmitter including:

means for generating an optical beam, means for modulating said optical beam to produce a frequency-modulated optical beam, acousto-optic deflector cell means for deflecting and introducing a Doppler shift into said frequency-modulated optical beam to produce a Doppler-shifted, deflected beam, and a receiver including:

a photodetector for receiving said Doppler-shifted, deflected beam, and demodulating means for determining a magnitude of said Doppler shift.

2. An optical communication system according to claim 1, wherein said means for modulating said optical beam is an acousto-optic modulator.

3. An optical communication system according to claim 1, wherein said receiver is a coherent detection receiving system..

4. An optical communication system according to claim 1, wherein said acousto-optic deflector cell means includes a digitally-controlled voltage to frequency converter for scanning said optical beam in a pre-determined manner.

5. An optical communication system transmitter comprising:

means for generating an optical beam;

acousto-optic modulator means for modulating said optical beam to produce a frequency-modulated optical beam;

acousto-optic deflector cell means for deflecting and introducing a Doppler shift into said frequency-modulated optical beam to produce a Doppler-shifted, deflected beam, said acousto-optic deflector cell means including a digitally-controlled voltage to frequency converter for scanning said optical beam in a pre-determined manner.

* * * * *

UNITED STATES PATENT AND TRADEMARK OFFICE
CERTIFICATE OF CORRECTION

PATENT NO. : 5,485,301

DATED : January 16, 1996

INVENTOR(S) : Lee D. MILLER

It is certified that error appears in the above-identified patent and that said Letters Patent is hereby corrected as shown below:

On title page,

In Item 73, delete "London" and insert

--Farnborough--.

Signed and Sealed this

Twenty-second Day of April, 1997

Attest:

*Attesting Officer*

BRUCE LEHMAN

*Commissioner of Patents and Trademarks*